(12) United States Patent
Liang et al.

(10) Patent No.: US 11,003,010 B2
(45) Date of Patent: May 11, 2021

(54) OPTICAL WAVEGUIDE DISPLAY SUBSTRATE, AND DISPLAY DEVICE

(71) Applicant: BOE TECHNOLOGY GROUP CO., LTD., Beijing (CN)

(72) Inventors: Kui Liang, Beijing (CN); Long Wang, Beijing (CN); Tuo Sun, Beijing (CN); Nanfang Jia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 93 days.

(21) Appl. No.: 16/464,430

(22) PCT Filed: Dec. 27, 2018

(86) PCT No.: PCT/CN2018/124280
§ 371 (c)(1),
(2) Date: May 28, 2019

(87) PCT Pub. No.: WO2019/218683
PCT Pub. Date: Nov. 21, 2019

(65) Prior Publication Data
US 2020/0319502 A1    Oct. 8, 2020

(30) Foreign Application Priority Data

May 15, 2018 (CN) .......... 201810460688.X

(51) Int. Cl.
*G02F 1/1335* (2006.01)
*G02F 1/1362* (2006.01)
*G02F 1/137* (2006.01)

(52) U.S. Cl.
CPC ........ *G02F 1/133502* (2013.01); *G02F 1/137* (2013.01); *G02F 1/133553* (2013.01);
(Continued)

(58) Field of Classification Search
None
See application file for complete search history.

(56) References Cited

U.S. PATENT DOCUMENTS 5,834,125 A * 11/1998 Lien .................. G03F 7/091
428/448
9,091,415 B2    7/2015 Bessho et al.
(Continued)

FOREIGN PATENT DOCUMENTS

CN    103733244 A    4/2014
CN    105047550 A    11/2015
(Continued)

OTHER PUBLICATIONS

International Search Report dated Mar. 27, 2019, issued in counterpart Application No. PCT/CN2018/124280 (12 pages).
(Continued)

*Primary Examiner* — Phu Vu
(74) *Attorney, Agent, or Firm* — Westerman, Hattori, Daniels & Adrian, LLP

(57) ABSTRACT

An optical waveguide display substrate includes a first base substrate (10); a reflective element (1) on the first base substrate (10), the reflective element (1) comprising a first surface facing the first base substrate (10), a second surface on an opposite side of the reflective element (1) from the bottom surface, and two light-receiving surfaces connecting the first surface to the second surface at opposite ends of the reflective element (1); and a first film assembly between the first base substrate (10) and the reflective element (1), the first film assembly comprising a first optical layer (2) and a second optical layer (3) on the first optical layer (2). A refractive index of the first optical layer (2) may be smaller
(Continued)

than a refractive index of the second optical layer (3). A display device includes the optical waveguide display substrate.

19 Claims, 4 Drawing Sheets

(52) U.S. Cl.
CPC .. *G02F 1/136209* (2013.01); *G02F 1/136286* (2013.01); *G02F 1/13775* (2021.01); *G02F 1/133524* (2013.01)

(56) References Cited

U.S. PATENT DOCUMENTS 9,691,794 B1  6/2017  Zhang

2017/0170199 A1* 6/2017 Zhang ................. H01L 51/5281

FOREIGN PATENT DOCUMENTS

| | | |
|---|---|---|
| CN | 106057909 A | 10/2016 |
| CN | 205983428 U | 2/2017 |
| CN | 107579166 A | 1/2018 |
| CN | 108681136 A | 10/2018 |
| JP | 2000-241809 A | 9/2000 |
| JP | 2013-105675 A | 5/2013 |

OTHER PUBLICATIONS

Office Action dated Apr. 9, 2020, issued in counterpart CN Application No. 201810460688.X, with English Translation. (14 pages).

* cited by examiner

OPTICAL WAVEGUIDE DISPLAY SUBSTRATE, AND DISPLAY DEVICE

CROSS-REFERENCE TO RELATED APPLICATIONS

This application claims benefit of the filing date of Chinese Patent Application No. 201810460688.X filed on May 15, 2018, the disclosure of which is hereby incorporated in its entirety by reference.

TECHNICAL FIELD

The present disclosure generally relates to display technology, and in particular to an optical waveguide display substrate and a display device containing the optical waveguide display substrate.

BACKGROUND

The transparency of a transparent display is precisely what draws consumers to the technology. Transparent displays used to be things of science fiction, but with advancements in display technology, transparent displays are playing an ever larger part in people's real, everyday lives. Transparent displays have myriad utilities in everyday lives, particularly when used to provide smart technologies, such as smart refrigerator, smart window, smart computer, and smart traffic signs.

BRIEF SUMMARY

An embodiment of the present disclosure is an optical waveguide display substrate. The optical waveguide display substrate may comprise a first base substrate; a reflective element on the first base substrate, the reflective element comprising a first surface facing the first base substrate, a second surface on an opposite side of the reflective element from the bottom surface, and two light-receiving surfaces connecting the first surface to the second surface at opposite ends of the reflective element; and a first film assembly between the first base substrate and the reflective element, the first film assembly comprising a first optical layer and a second optical layer. In some embodiments, a refractive index of the first optical layer may be smaller than a refractive index of the second optical layer. In some embodiments, an orthographic projection of the first optical layer on the first base substrate may overlap with an orthographic projection of the reflective element on the first base substrate. In some embodiments, an orthographic projection of the second optical layer on the first base substrate may overlap with the orthographic projection of the reflective element on the first base substrate.

In some embodiments, the orthographic projection of the reflective element on the first base substrate may be within each of the orthographic projections of the first optical layer and the second optical layer on the first base substrate.

In some embodiments, the second optical layer may be closer to the reflective element than the first optical layer.

In some embodiments, the second optical layer may be in direct contact with the reflective element.

In some embodiments, the first optical layer may comprise a transparent insulating material.

In some embodiments, the second optical layer may comprise an amorphous semiconductor material.

In some embodiments, the optical waveguide display substrate may further comprise a second film assembly that covers at least partially the top surface and the side surfaces of the reflective element, the second film assembly comprising a third optical layer and a fourth optical layer. In some embodiments, a refractive index of the third optical layer may be larger than a refractive index of the fourth optical layer. In some embodiments, the third optical layer and the fourth optical layer may be arranged, in this order, on the reflective element in a direction away from the first base substrate.

In some embodiments, the third optical layer may cover at least partially the top surface of the reflective element, and the fourth optical layer may cover a portion of the top surface of the reflective element that is not covered by the third optical layer.

In some embodiments, the third optical layer may cover an entirety of the top surface of the reflective element.

In some embodiments, an orthographic projection of the third optical layer on the first base substrate may overlap with the orthographic projection of the reflective element on the first base substrate. In some embodiments, an orthographic projection of the fourth optical layer on the first base substrate may overlap with the orthographic projection of the reflective element on the first base substrate.

In some embodiments, the orthographic projection of the third optical layer on the first base substrate may be within the orthographic projection of the reflective element on the first base substrate. In some embodiments, the orthographic projection of the reflective element on the first base substrate may be within the orthographic projection of the fourth optical layer on the first base substrate.

In some embodiments, the third optical layer may comprise an amorphous semiconductor material. The fourth optical layer may comprise a transparent insulating material. The first optical layer may have a thickness of 500 Å-600 Å. The second optical layer may have a thickness of 400 Å-800 Å. The third optical layer may have a thickness of 400 Å-800 Å. The fourth optical layer may have a thickness of 500 Å-600 Å.

In some embodiments, the optical waveguide display substrate may further comprise a buffer layer between the reflective element and the third optical layer. In some embodiments, the buffer layer may comprise an insulating material.

In some embodiments, the reflective element may comprise at least one selected from the group consisting of a gate line, a data line, and a thin film transistor.

In some embodiments, the reflective element may be a gate line, and the fourth optical layer may comprise a gate insulating layer.

Another embodiment of the present disclosure is a display device. The display device may comprise an optical waveguide display substrate as described above; a second base substrate that is opposite from the display substrate; and a liquid crystal cell between the display substrate and the second base substrate.

In some embodiments, the display device may comprise a black matrix on the second base substrate at a position corresponding to the reflective element of the optical waveguide display substrate.

In some embodiments, the liquid crystal cell may comprise polymer-stabilized liquid crystals.

In some embodiments, the display device is a transparent display device.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

Figure 1:
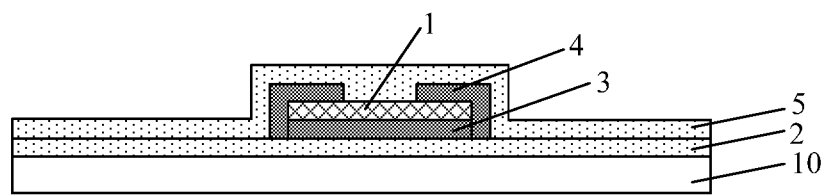
FIGS. 1 and 2 show schematic diagrams of a display substrate according to an embodiment of the present disclosure.

The various features of the drawings are not to scale as the illustrations are for clarity in facilitating one skilled in the art in understanding the invention in conjunction with the detailed description.

DETAILED DESCRIPTION

Next, the embodiments of the present disclosure will be described clearly and concretely in conjunction with the accompanying drawings, which are described briefly above. The subject matter of the present disclosure is described with specificity to meet statutory requirements. However, the description itself is not intended to limit the scope of this disclosure. Rather, the inventors contemplate that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiments for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

A numerical range modified by "approximately" herein means that the upper and lower limits of the numerical range can vary by 10% thereof. A number modified by "approximately" herein means that the number can vary by 10% thereof.

The transparency of a transparent display is precisely what draws consumers to the technology. Transparent displays used to be things of science fiction, but with advancements in display technology, transparent displays are playing an ever larger part in people's real, everyday lives. Transparent displays have myriad utilities in everyday lives, particularly when used to provide smart technologies, such as smart refrigerator, smart window, smart computer, and smart traffic signs.

However, conventional technologies, such as liquid crystal displays (LCD) and organic light-emitting diodes (OLED), have low transmittance when used in a transparent display. For example, the transmittance of an LCD is less than 10% when used in a transparent display device, and the transmittance of an OLED is less than 40%. Polymer-dispersed liquid crystal displays, electrochromic displays, and electrowetting displays may allow higher transmittance as compared to LCDs or OLEDs, but their responsiveness is lower, often requiring tens or hundreds of milliseconds. In addition, most transparent displays are induced into a transparent state only when a voltage is applied, but are by default opaque. There is thus a need for a display technology that provides high transparency, low power consumption, rapid response rate, and other advantages.

Polymer-stabilized liquid crystals (PSLC) are composites where polymer networks are dispersed in liquid crystals. The polymer networks mimic the structure and orientation of the liquid crystals. Recent developments in display technology have focused on PSLC, and display devices incorporating PSLC has shown to exhibit improved transparency, responsiveness, and energy efficiency. One unique feature of a PSLC display is that the liquid crystal cell itself can function as an optical waveguide plate, and can drive display functions. This capability of a PSLC display has been termed a "waveguide display". Light is incident on the side, and the display device is in a transparent state (like a piece of glass with transparency as high as 90%) when nothing is being displayed, so that power can be conserved. When an image needs to be displayed, voltage is applied to a specific area, changing the orientation of the corresponding liquid crystals. The presence of polymers causes the orientation of the liquid crystals to become disordered, light becomes scattered, and a display image is generated. The presence of polymers increases the responsiveness of the display device to as quickly as 1 to 2 milliseconds.

In a passive matrix-type display and a thin film transistor-driven active matrix-type display, the presence of signal lines, drive lines, and thin film transistors can interfere with the display effects. Incident light that enters the display device may be reflected by the metal layer, or the regions of overlap between the metal layer and the electrode layer may scatter the incident light, which can reduce the display contrast and interfere with the display.

Figure 2:
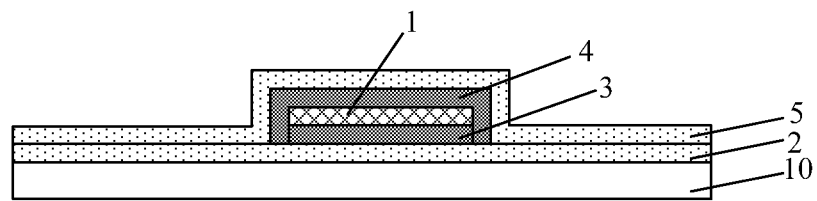
Figure 3:
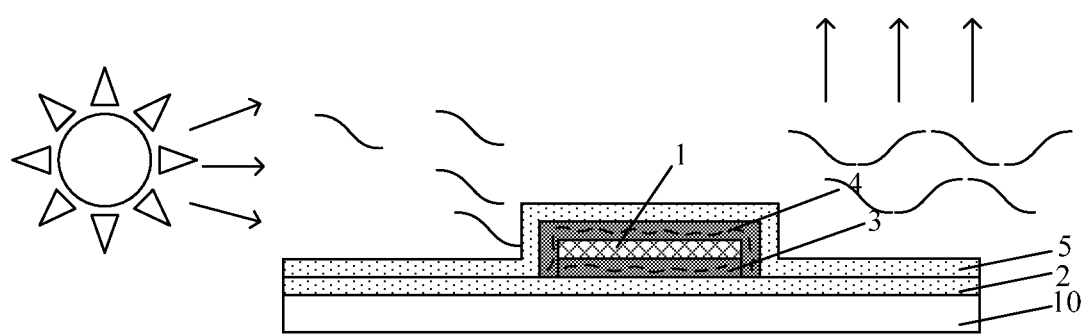
FIG. 3 shows a schematic diagram illustrating the behavior of incident light with respect to a display substrate according to an embodiment of the present disclosure.

As shown in FIGS. 1 to 3, the present disclosure provides a display substrate. The display substrate is configured to be incorporated in a transparent display device, including but not limited to a waveguide display. That is, in some embodiments, the display substrate is an optical waveguide display substrate. The display substrate comprises a base substrate 10, and a reflective element 1 on the base substrate 10. The reflective element 1 comprises a bottom surface, a top surface, and two side surfaces that connect the bottom surface and the top surface. The bottom surface of the reflective element 1 faces the base substrate 10, and the top surface of the reflective element 1 is on a side of the reflective element 1 opposite from the base substrate 10.

At least one first film assembly is between the reflective element 1 and the base substrate 10, and in particular, between the bottom surface of the reflective element 1 and the base substrate 10. The display substrate may comprise a single first film assembly, or a plurality of first film assemblies. At least one second film assembly is on at least one side surface of the reflective element 1 and on a periphery of the reflective element 1. The display substrate may comprise a single second film assembly, or a plurality of second film assemblies. In some embodiments, no portion of the reflective element 1 is exposed, that is, an entirety of the reflective element 1 is enclosed by the at least one first film assembly and the at least one second film assembly.

The first film assembly comprises a first optical layer 2 and a second optical layer 3. The first optical layer 2 and the second optical layer 3 are stacked in this order in a direction away from the base substrate 10. The first optical layer 2 and the second optical layer 3 each overlaps at least partially with the reflective element 1. More particularly, at least a portion of an orthographic projection of the first optical layer 2 on the base substrate 10 overlaps with an orthographic projection of the reflective element 1 on the base substrate 10, and at least a portion of an orthographic projection of the second optical layer 3 overlaps with the orthographic projection of the reflective element 1 on the base substrate 10. In some embodiments, the first optical layer 2 is between the base substrate 10 and the second optical layer 3. In some embodiments, the orthographic projection of the reflective element on the first base substrate is within each of the orthographic projections of the first optical layer 2 and the second optical layer 3 on the base substrate 10. In some embodiments, the first optical layer 2 is not in contact with the reflective element 1, and only the second optical layer 3 is in contact with the reflective element 1.

The refractive index of the first optical layer 2 is smaller than the refractive index of the second optical layer 3. In some embodiments, the first optical layer 2 is composed of a first material, for example, a transparent insulating material, including, but not limited to, silicon nitride ($SiN_x$, refractive index: about 2.0), tantalum nitride, tantalum oxide, yttrium oxide, and lanthanum oxide. The second optical layer 3 is composed of a second material, for example, an amorphous semiconductor material including, but not limited to, amorphous silicon (a-Si, refractive index: about 4.4) and amorphous germanium.

The second film assembly comprises a third optical layer 4 and a fourth optical layer 5. The third optical layer 4 and the fourth optical layer 5 are stacked in this order in a direction away from the base substrate 10. The third optical layer 4 and the fourth optical layer 5 each covers at least a portion of the reflective element 1. More particularly, an orthographic projection of the third optical layer 4 on the base substrate 10 at least partially overlaps with the orthographic projection of the reflective element 1 on the base substrate 10, and an orthographic projection of the fourth optical layer 5 on the base substrate 10 at least partially overlaps with the orthographic projection of the reflective element 1 on the base substrate 10. In some embodiments, the orthographic projection of the third optical layer on the first base substrate is within the orthographic projection of the reflective element on the first base substrate. In some embodiments, the orthographic projection of the reflective element on the first base substrate is within the orthographic projection of the fourth optical layer on the first base substrate.

In some embodiments, the third optical layer 4 covers the side surfaces of the reflective element 1 and a portion of the top surface of the reflective element 1. For example, as shown in FIG. 1, the third optical layer 4 extends along the side surfaces of the reflective element 1 and folds over the top surface of the reflective element 1, so that the third optical layer 4 covers the side surfaces and the peripheral regions of the top surface of the reflective element 1. In addition, the second optical layer 3 may cover an entirety of the bottom surface of the reflective element 1, so that in such embodiments, the second optical layer 3 and the third optical layer 4 partially enclose the reflective element 1.

In some embodiments, the third optical layer 4 covers an entirety of the side surfaces of the reflective element 1 and an entirety of the top surface of the reflective element 1. In addition, the second optical layer 3 may cover an entirety of the bottom surface of the reflective element 1, so that in such embodiments, the second optical layer 3 and the third optical layer 4 completely enclose the reflective element 1.

The refractive index of the fourth optical layer 5 is smaller than the refractive index of the third optical layer 4. In some embodiments, the fourth optical layer 5 and the first optical layer 2 are composed of the same material, that is, the first material, for example, silicon nitride ($SiN_x$, refractive index: about 2.0). In some embodiments, the third optical layer 4 and the second optical layer 3 are composed of the same material, that is, the second material, for example, amorphous silicon (a-Si, refractive index: about 4.4).

The thickness of each of the first optical layer 2 and the second optical layer 5 is generally in the range of 500 Å-600 Å. The first optical layer 2 and the second optical layer 5 may have the same thickness or different thicknesses. The thickness of each of the third optical layer 3 and the fourth optical layer 4 is generally in the range of 400 Å-800 Å. The third optical layer 3 and the fourth optical layer 4 may have the same thickness or different thicknesses.

In some embodiments, the reflective element 1 is composed of a metal material. In some embodiments, the reflective element 1 is a structure composed of a metal conductive material. For example, the reflective element 1 may comprises a gate line, a data line, an electrode, a thin film transistor, and/or the like.

The reflective element 1 may have a rectangular shape, a trapezoidal shape, or any appropriate shape known to a person of ordinary skill in the art, and the present disclosure is not particularly limiting in this regard.

In the display substrate according to the present disclosure, the first film assembly is between the base substrate 10 and the reflective element 1, and the orthographic projections of the first optical layer 2 and the second optical layer 3 on the base substrate 10 overlaps with the orthographic projection of the reflective element 1 on the base substrate. In addition, the refractive index of the first optical layer 2 is smaller than the refractive index of the second optical layer 3. When incident light reaches the interface between the first optical layer 2 and the second optical layer 3, a portion of the incident light is reflected, and when the first optical layer 2 has a certain thickness (for example, in the range of 500 Å-600 Å), half-waves having opposite wave vectors (for example, traveling in opposite directions) become superposed on each other to produce light-canceling effect. As a result, the portion of the incident light that is reflected will not reach the reflective element 1. The remaining portion of the incident light passes through the second optical layer 3 to reach the interface between the second optical layer 3 and the reflective element 1. At this interface, some of the incident light may also be reflected, further weakening the light intensity. In addition, the second optical layer 3 may absorb a certain amount of the incident light. The intensity of the incident light that ultimately reaches the pixel region may be less than 10%.

Figure 4:
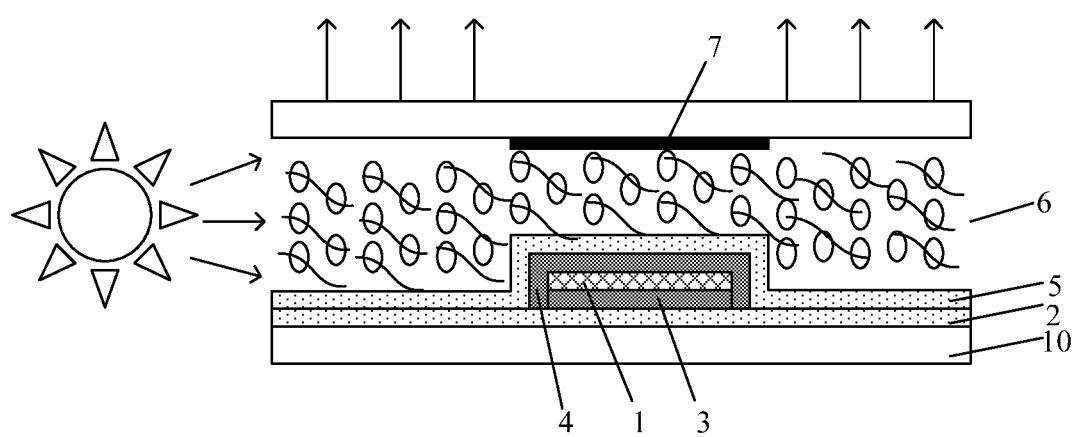
FIG. 4 shows a schematic diagram of a display device according to an embodiment of the present disclosure.

When the display substrate according to the present disclosure is incorporated into a display device, incident light enters from the side of the liquid crystal cell 6 of the display device, for example, as shown in FIG. 4. As incident light travels through the liquid crystal cell 6, a portion of the incident light is reflected toward the side surfaces and the periphery of the reflective element 1 (for example, along the connections between the top surface and the side surfaces of the reflective element 1). However, the second film assembly covers the side surfaces and at least the periphery of the reflective element 1. The second film assembly comprises the third optical layer 4 and the fourth optical layer 5 stacked in this order in a direction away from the base substrate 10. The refractive index of the fourth optical layer 5 is smaller than the refractive index of the third optical layer 4. Subject to similar optical effects as the first and second optical layers 2, 3, and under the action of the second film assembly, light incident on the side and periphery of the reflective element 1 may reach the pixel region with an intensity of less than 10%.

With the exception of the light that has been canceled due to light-canceling effect, the remaining portion of the incident light is confined to a single optical path, and is propagated along the optical path. The optical path follows along the second optical layer 3 in the stack of reflective element 1/second optical layer 3/first optical layer 2, and also the third optical layer 4 in the stack of reflective element 1/third optical layer 4/fourth optical layer 5, for example, as shown in FIG. 3. After being propagated along the optical path, a portion of the light continues to be transmitted in the liquid crystal cell 6 of the display device. The present disclosure thus makes it possible to avoid the problem of light spots caused by direct reflection by the reflective element, and to increase the efficiency of light utilization. Meanwhile, another portion of the propagated light reaches the pixel region through the optical waveguide, and is scattered outside of the display device. The light cannot converge, and will not affect the display generated by the display device.

In some embodiments, the first optical layer 2 of the first film assembly is a transparent insulator. The first optical layer 2 is composed of a transparent insulating material, including, but not limited to, silicon nitride, tantalum nitride, tantalum oxide, yttrium oxide, and lanthanum oxide. The first optical layer 2 may comprise a single layer or a plurality of layers. For example, in some embodiments, the first optical layer 2 may comprise a single layer composed of at least one of silicon nitride, yttrium oxide and tantalum nitride. In some embodiments, the first optical layer 2 may comprise a plurality of layers composed of tantalum nitride or lanthanum oxide. Since the first optical layer 2 is composed of a transparent material, the first optical layer 2 is provided to cover the base substrate 10, which can facilitate production. The first optical layer 2 has a thickness of 500 Å-600 Å. At least a portion of an orthographic projection of the first optical layer 2 on the base substrate 10 overlaps with an orthographic projection of the reflective element 1 on the base substrate 10

In some embodiments, the second optical layer 3 of the first film assembly is composed of a semiconductor material. In some embodiments, the second optical layer 3 is composed of an amorphous semiconductor material, including, but not limited to, amorphous germanium and amorphous silicon. At least a portion of an orthographic projection of the second optical layer 3 overlaps with the orthographic projection of the reflective element 1 on the base substrate 10. The second optical layer 3 has a thickness of 400 Å-800 Å. In some embodiments, the thickness of the second optical layer 3 is thicker than the thickness of the first optical layer 2. However, the relative thicknesses of the first and second optical layers 2, 3 are not particularly limited, and the first and second optical layers 2, 3 may have any combination of thicknesses that are known to be appropriate to a person of ordinary skill in the art. The refractive index of the first optical layer 2 is smaller than the refractive index of the second optical layer 3.

In some embodiments, the third optical layer 4 of the second film assembly covers at least a portion of the top surface of the reflective element and at least a portion of the side surfaces of the reflective element 1. This can minimize the amount of light that is reflected by the top surface of the reflective element 1, and avoid the generation of light spots. The third optical layer 4 may be composed of the same second material as the second optical layer 3, that is, a semiconductor material. In some embodiments, the semiconductor material is an amorphous semiconductor material, including, but not limited to, amorphous germanium and amorphous silicon. An orthographic projection of the third optical layer 4 on the base substrate 10 overlaps at least partially with the orthographic projection of the reflective element 1 on the base substrate 10. In some embodiments, the orthographic projection of the third optical layer 4 on the base substrate 10 covers an entirety of the orthographic projection of the reflective element 1 on the base substrate. The third first optical layer 4 has a thickness of 400 Å-800 Å.

The fourth optical layer 5 of the second film assembly is provided on the third optical layer 4. The fourth optical layer 5 may be composed of the same first material as the first optical layer 2. More particularly, the fourth optical layer 5 may be composed of a transparent insulating material, including, but not limited to, silicon nitride, tantalum nitride, tantalum oxide, yttrium oxide, and lanthanum oxide. An orthographic projection of the fourth optical layer 5 on the base substrate 10 overlaps at least partially with the orthographic projection of the reflective element 1 on the base substrate 10. In some embodiments, the orthographic projection of the fourth optical layer 5 on the base substrate 10 covers an entirety of the orthographic projection of the reflective element 1 on the base substrate. The fourth optical layer 5 has a thickness of 500 Å-600 Å. In some embodiments, the thickness of the third optical layer 4 is thicker than the thickness of the fourth optical layer 5. However, the relative thicknesses of the third and fourth optical layers 4, 5 are not particularly limited, and the third and fourth optical layers 4, 5 may have any combination of thicknesses that are known to be appropriate to a person of ordinary skill in the art.

In some embodiments, a buffer layer is provided between the reflective element 1 and the third optical layer 4. The buffer layer protects the reflective element 1 from damages during fabrication of the third optical layer 4. The buffer layer may be composed of a transparent material. The transparent material may be at least one selected from the group consisting of tantalum nitride and tantalum oxide. However, the material for forming the buffer layer is not particularly limited, and the buffer layer may be formed using any appropriate known to a person of ordinary skill in the art, so long as the material is capable of protecting the reflective element 1 from damages during production. The buffer layer composed of a transparent material is provided to cover the base substrate 10, which can facilitate production.

In some embodiments, the display substrate may comprise only the at least one first film assembly between the bottom surface of the reflective element 1 and the base substrate 10. Each of the at least one first film assembly comprises a first optical layer 2 and the second optical layer 3. The first optical layer 2 and the second optical layer 3 each overlaps at least partially with the reflective element 1. More particularly, at least a portion of an orthographic projection of the first optical layer 2 on the base substrate 10 overlaps with an orthographic projection of the reflective element 1 on the base substrate 10, and at least a portion of an orthographic projection of the second optical layer 3 overlaps with the orthographic projection of the reflective element 1 on the base substrate 10. In some embodiments, the orthographic projection of the reflective element 1 on the base substrate 10 overlaps entirely with the orthographic projection of the second optical layer 3 on the base substrate 10. The refractive index of the first optical layer 2 is smaller than the refractive index of the second optical layer 3.

In some embodiments, the display substrate may comprise only the at least one second film assembly on at least one side surface of the reflective element 1 and on a periphery of the reflective element 1. The second film assembly comprises a third optical layer 4 and a fourth optical layer 5. The third optical layer 4 and the fourth optical layer 5 are stacked in this order in a direction away from the base substrate 10. The third optical layer 4 and the fourth optical layer 5 each covers at least a portion of the reflective element 1. More particularly, an orthographic projection of the third optical layer 4 on the base substrate 10 at least partially overlaps with the orthographic projection of the reflective element 1 on the base substrate 10, and an orthographic projection of the fourth optical layer 5 on the base substrate 10 at least partially overlaps with the orthographic projection of the reflective element 1 on the base substrate 10. In some embodiments, the third optical layer 4 and the fourth optical layer 5 cover an entirety of the reflective element 1, so that the orthographic projections of the third and fourth optical layers 4, 5 on the base substrate 10 covers an entirety of the orthographic projection of the reflective element 1 on the base substrate 10. The refractive index of the fourth optical layer 5 is smaller than the refractive index of the third optical layer 4.

The present disclosure also provides a method of fabricating the display substrate. In some embodiments, the reflective element in the display substrate according to the present disclosure is a gate line, a data line, an electrode, or the like. For illustrative purpose, a method of fabricating a display substrate according to the present disclosure, in which the reflective element is a gate line, is described below.

In step 1, the first optical layer 2 is formed on the base substrate 10. The first optical layer 2 is composed of a transparent insulating material, including, but not limited to, silicon nitride, yttrium oxide, tantalum oxide, tantalum nitride, and lanthanum oxide. The first optical layer 2 may comprise a single layer or a plurality of layers. For example, in some embodiments, the first optical layer 2 may comprise a single layer composed of at least one of silicon nitride, yttrium oxide and tantalum nitride. In some embodiments, the first optical layer 2 may comprise a plurality of layers composed of tantalum nitride or lanthanum oxide. The first optical layer 2 has a thickness of 500 Å-600 Å. The refractive index of the first optical layer 2 is not particularly limited, so long as the refractive index of the first optical layer 2 is smaller than the refractive index of the second optical layer 3. In some embodiments, the first optical layer 2 may comprise a single layer composed of silicon nitride, which has a refractive index of about 2.0.

In step 2, a layer of second optical layer forming material is formed on the first optical layer 2. The second optical layer forming material may comprise an amorphous semiconductor material, including amorphous silicon and amorphous germanium. The layer of second optical layer forming material has a thickness of 400 Å-800 Å. The refractive index of the second optical layer 3 is not particularly limited, so long as the refractive index of the second optical layer 3 is larger than the refractive index of the first optical layer 2. In some embodiments, the second optical layer 3 is composed of amorphous silicon having a refractive index of about 4.4. The layer of second optical layer forming material is patterned to form the second optical layer 3.

In step 3, a gate metal material layer is formed on the base substrate 10. The gate metal material layer has a thickness of from 500 Å to 6000 Å. In some embodiments, the gate metal material layer has a thickness of about 800 Å. The thicknesses of the optical layers 2, 3, 4, 5 may be increased with increasing thickness of the gate metal material layer. The gate metal material layer is patterned to form gate electrodes and gate lines. An orthographic projection of the second optical layer 3 on the base substrate 10 may cover an entirety of the orthographic projections of the gate electrodes and gate lines on the base substrate 10.

In step 4, a layer of third optical layer forming material is formed on the base substrate 10. The material for forming the third optical layer 4 may be the same as that of the second optical layer 3, for example, an amorphous semiconductor material such as amorphous germanium. The layer of third optical layer forming material has a thickness of 400 Å-800 Å. The refractive index of the third optical layer 4 is not particularly limited, so long as the refractive index of the third optical layer 4 is larger than the refractive index of the fourth optical layer 5. In some embodiments, the third optical layer 4 is composed of amorphous silicon having a refractive index of about 4.4. The layer of third optical layer forming material is patterned to form the third optical layer 4. An orthographic projection of the third optical layer 4 on the base substrate 10 may cover an entirety of the orthographic projections of the gate electrodes and gate lines on the base substrate 10.

In step 5, a gate insulating layer is formed on the base substrate 10 to form the fourth optical layer 5. The fourth optical layer 5 may comprise a single layer composed of at least one of yttrium oxide and tantalum nitride. In some embodiments, the fourth optical layer 5 may comprise a plurality of layers composed of tantalum nitride or lanthanum oxide. The fourth optical layer 5 has a thickness of 500 Å-600 Å. The refractive index of the fourth optical layer 5 is not particularly limited, so long as the refractive index of the fourth optical layer 5 is smaller than the refractive index of the third optical layer 4. In some embodiments, the fourth optical layer 5 may comprise a single layer composed of silicon nitride, which has a refractive index of about 2.0

In step 6, an active layer, a source/drain metal pattern, and a passivation layer are sequentially formed on the base substrate 10. The passivation layer may comprise at least one selected from the group consisting of cerium oxide, cerium oxynitride, and cerium nitride.

The present disclosure also provides a display device. The display device comprises a first base substrate and a second base substrate that is opposite from the first base substrate, for example, as shown in FIG. 4. At least one of the first substrate and the second substrate is a display substrate as described above. In some embodiments, the display device is a transparent display device. The first substrate and the second substrate are oppositely disposed to form a liquid crystal cell 6. The liquid crystal cell 6 comprises liquid crystal molecules. In some embodiments, the liquid crystal molecules comprise polymer-stabilized liquid crystal molecules.

As shown in FIG. 4, the first substrate is the display substrate as described above. The reflective element 1 may be a structure (for example, a gate line) composed of a metal conductive material. A black matrix 7 is provided on the second substrate at a position corresponding to the reflective element 1. The black matrix 7 is configured to prevent liquid crystal molecules at the position of the reflective element 1 from rotating unnecessarily and causing light leakage, which can interfere with the display produced by the display device.

The display device according to the present disclosure may be integrated into any products that provide a display function, including, but not limited to, a liquid crystal display panel, an electronic paper, a mobile phone, a tablet, a television, a notebook, a digital photo frame, and a navigation system.

In the description of the specification, references made to the term "some embodiment," "some embodiments," and "exemplary embodiments," "example," and "specific example," or "some examples" and the like are intended to refer that specific features and structures, materials or characteristics described in connection with the embodiment or example that are included in at least some embodiments or example of the present disclosure. The schematic expression of the terms does not necessarily refer to the same embodiment or example. Moreover, the specific features, structures, materials or characteristics described may be included in any suitable manner in any one or more embodiments or examples. In addition, for a person of ordinary skill in the art, the disclosure relates to the scope of the present disclosure, and the technical scheme is not limited to the specific combination of the technical features, and also should covered other technical schemes which are formed by combining the technical features or the equivalent features of the technical features without departing from the inventive concept. What is more, the terms "first" and "second" are for illustration purposes only and are not to be construed as indicating or implying relative importance or implied reference to the quantity of indicated technical features. Thus, features defined by the terms "first" and "second" may explicitly or implicitly include one or more of the features. In the description of the present disclosure, the meaning of "plural" is two or more unless otherwise specifically and specifically defined.

The principle and the embodiment of the present disclosures are set forth in the specification. The description of the embodiments of the present disclosure is only used to help understand the method of the present disclosure and the core idea thereof meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. An optical waveguide display substrate, comprising:
   a first base substrate;
   a reflective element on the first base substrate, the reflective element comprising a first surface facing the first base substrate, a second surface on an opposite side of the reflective element from the bottom surface, and two light-receiving surfaces connecting the first surface to the second surface at opposite ends of the reflective element; and
   a first film assembly between the first base substrate and the reflective element, the first film assembly comprising a first optical layer and a second optical layer on the first optical layer;
   a second film assembly that covers at least the side surfaces of the reflective element, the second film assembly comprising a third optical layer and a fourth optical layer,
   wherein:
   a refractive index of the first optical layer is smaller than a refractive index of the second optical layer,
   an orthographic projection of the first optical layer on the first base substrate overlaps with an orthographic projection of the reflective element on the first base substrate, and
   an orthographic projection of the second optical layer on the first base substrate overlaps with the orthographic projection of the reflective element on the first base substrate;
   a refractive index of the third optical layer is larger than a refractive index of the fourth optical layer and the third optical layer and the fourth optical layer are arranged, in this order, on the reflective element in a direction away from the first base substrate.

2. The optical waveguide display substrate according to claim 1, wherein the orthographic projection of the reflective element on the first base substrate is within each of the orthographic projections of the first optical layer and the second optical layer on the first base substrate.

3. The optical waveguide display substrate according to claim 1, wherein the second optical layer is closer to the reflective element than the first optical layer.

4. The optical waveguide display substrate according to claim 1, wherein the second optical layer is in direct contact with the reflective element.

5. The optical waveguide display substrate according to claim 1, wherein the first optical layer comprises a transparent insulating material.

6. The optical waveguide display substrate according to claim 1, wherein the second optical layer comprises an amorphous semiconductor material.

7. The optical waveguide display substrate according to claim 1, further comprising a second film assembly that covers at least partially the top surface and the side surfaces of the reflective element, the second film assembly comprising a third optical layer and a fourth optical layer,
   wherein:
   a refractive index of the third optical layer is larger than a refractive index of the fourth optical layer, and
   the third optical layer and the fourth optical layer are arranged, in this order, on the reflective element in a direction away from the first base substrate.

8. The optical waveguide display substrate according to claim 1, wherein the third optical layer covers at least partially the top surface of the reflective element, and the fourth optical layer covers a portion of the top surface of the reflective element that is not covered by the third optical layer.

9. The optical waveguide display substrate according to claim 1, wherein the third optical layer covers an entirety of the top surface of the reflective element.

10. The optical waveguide display substrate according to claim 1, wherein:
    an orthographic projection of the third optical layer on the first base substrate overlaps with the orthographic projection of the reflective element on the first base substrate, and
    an orthographic projection of the fourth optical layer on the first base substrate overlaps with the orthographic projection of the reflective element on the first base substrate.

11. The optical waveguide display substrate according to claim 10, wherein:

the orthographic projection of the third optical layer on the first base substrate is within the orthographic projection of the reflective element on the first base substrate, and the orthographic projection of the reflective element on the first base substrate is within the orthographic projection of the fourth optical layer on the first base substrate.

12. The display substrate according to claim 1, wherein:
the third optical layer comprises an amorphous semiconductor material,
the fourth optical layer comprises a transparent insulating material,
the first optical layer has a thickness of 500 Å-600 Å,
the second optical layer has a thickness of 400 Å-800 Å,
the third optical layer has a thickness of 400 Å-800 Å, and
the fourth optical layer has a thickness of 500 Å-600 Å.

13. The optical waveguide display substrate according to claim 1, further comprising a buffer layer between the reflective element and the third optical layer,
wherein the buffer layer comprises an insulating material.

14. The optical waveguide display substrate according to claim 1, wherein the reflective element comprises at least one selected from the group consisting of a gate line, a data line, and a thin film transistor.

15. The optical waveguide display substrate according to claim 13, wherein:
the reflective element is a gate line, and
the fourth optical layer comprises a gate insulating layer.

16. A display device, comprising:
the optical waveguide display substrate according to claim 1,
a second base substrate that is opposite from the display substrate, and
a liquid crystal cell between the display substrate and the second base substrate.

17. The display device according to claim 16, further comprising a black matrix on the second base substrate at a position corresponding to the reflective element of the optical waveguide display substrate.

18. The display device according to claim 16, wherein the liquid crystal cell comprises polymer-stabilized liquid crystals.

19. The display device according to claim 16, wherein the display device is a transparent display device.

* * * * *